3,266,035
METHOD AND SYSTEM FOR REDUCING THE STATISTIC FLUCTUATIONS OF THE CONTROL SIGNAL IN ELECTRICAL FOLLOW-UP SERVO-SYSTEMS, PARTICULARLY RADAR TARGET-TRACKING SYSTEMS
Frank Farner, Zurich, Switzerland, assignor to Albiswerk Zurich A. G., Zurich, Switzerland, a Swiss corporation
Filed June 23, 1964, Ser. No. 377,191
Claims priority, application Switzerland, June 28, 1963, 8,076/63
15 Claims. (Cl. 343—7.4)

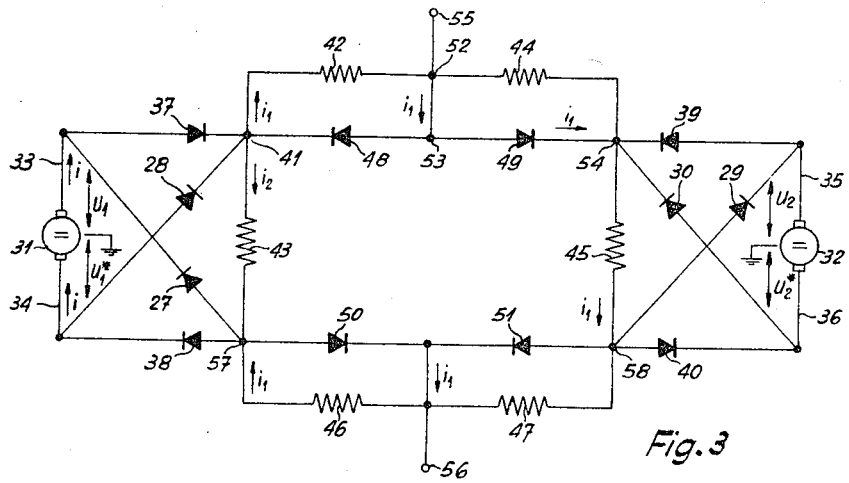

My invention relates to a method and means for reducing the statistic fluctuations of the control signal in electric follow-up servo or feedback control systems and, in a more particular aspect, in radar target-tracking systems.

In feedback control systems the actual or pilot value of the regulated variable is usually measured by means of a sensor or measuring device. The value of the pilot signal thus obtained is compared with a datum or reference value and the resulting difference, called "error signal," is used for deriving therefrom a control signal or manipulated variable which acts upon the regulated variable in the sense and by the amount required to make the pilot signal equal, within the accuracy limits of the system, to the datum value, thus eliminating the error signal and terminating the effect of the control signal. In many systems of this type, the datum value of the regulated variable remains constant, althoughg this datum value may be adjusted to different amounts from time to time. The regulation operates to obviate the effects of a disturbance magnitude, constituting a signal, other than the datum or reference input, which tends to affect the value of the regulated variable. In other feedback control systems, the datum value varies continuously, and the pilot value must continuously follow the changes in pilot value. The latter systems are known as follow-up servosystems.

In both types of regulating systems, it is often observed that the controlled variable and the datum quantity exhibit statistic fluctuations. Such fluctuations are transmitted to the control member or device from which the value of the controlled variable is dependent. This tends to produce the undesired phenomenon of hunting, namely a substantially periodic variation of the pilot value about the datum value. Various methods and means are known for preventing hunting by damping or attenuation. The introduction of attenuating means, however, renders the regulating performance more sluggish. Other known ways to prevent hunting involve the derivation of anticipatory signals from the rate of change of the regulated magnitude or from the second differential derivation thereof; but such expedients render the systems rather complicated, particularly if a high degree of accuracy is required. While for some purposes, such as the feedback control of certain fabricating machinery, the above-mentioned shortcomings are not appreciable or still acceptable, they are becoming more and more decisive with the modern development of follow-up servosystems where extremely high rates of change with respect to the controlled variable and exacting accuracy requirements are involved, this being the case, for example, with target-tracking radar systems.

The above-mentioned fluctuation phenomena, therefore, will be elucidated with reference to the follow-up control of the angular antenna motion in a target-tracking radar system.

In a tracking radar system operating with a conical scanning motion, the directional radar beam rotates at a given angle of inclination to the antenna axis so that the spacial configuration of the scan is conical and is known as a conical scan. A target located within the directional beam modulates the radar echo signal, and this permits determining the target position relative to the antenna axis. However, due to the effect of various disturbances, the tracking of the target is not accurate. The antenna axis rather performs certain statistical fluctuations relative to the target center point, and these fluctuations simulate non-existent positional changes of the target and thus make the accurate location of the target position more difficult. Diverse reasons are responsible for such apparent target movements:

(1) The "gravity" center of a reflected beam coming from a moving target moves continuously, due to variation of the angle of incidence of the arriving beam, the movement being within, and temporarily even outside of, the target viewing plane. In radar terminology this phenomenon is called "angle noise."

(2) In certain radar target-tracking systems, for example those operating with a conical scan, the fluctuation of the echo amplitude caused by the continuous variation of the reflected-beam cross section, influences the angle-error voltage of the radar receiver in such a manner that the control voltages derived therefrom simulate target misdistances. This phenomenon is called "amplitude noise."

(3) The so-called "receiver noise" generated in the radar receiver itself, likewise produces statistically fluctuating error voltages.

(4) Fluctuations may also arise due to the disturbance voltages originating in the servosystem and mechanical clearance in the follow-up mechanisms. These are known as "servo noise."

In the design and operation of tracking radars it is desired to minimize such fluctuations in order to increase the accuracy of the continuous measurement of the target angular coordinates.

An obvious way of reducing errors due to fluctuations is to apply averaging over relatively long intervals of time. This is not suitable in many cases because it unduly increases the time constant of the servosystem so that the dynamic accuracy of the target-tracking performance is unsatisfactory.

It is an object of my invention to devise a method and means for minimizing the above-mentioned disturbing influences of fluctuations without impairing the time constant of the follow-up servosystem.

According to my invention, relating generally to a follow-up servosystem or feedback control system generally of the above-mentioned type, such a system is provided with at least two measuring or sensing devices for providing respective pilot signals that are at least partially independent of each other and whose statistic disturbances are not mutually related to each other. The fluctuation-independent pilot signals are compared with respective datum or reference quantities so as to produce respectively different error signals, and the smallest one of the error signals thus available at a time is selected for causing a variation of the controlled variable, that is, for correspondingly actuating the servo-operated control member which determines the quantity or condition being feedback-controlled.

According to another feature of my invention, I perform the above-mentioned method with the aid of a feedback circuit system which comprises two sensing or measuring devices for providing respective pilot signals independent of each other with respect to statistic fluctuations, and I produce the respective two error signals in the form of respective unidirectional voltages. These are supplied to respective diode circuits connected to an amplitude discriminator which at any time select the one direct voltage having the smaller magnitude and passes it to the control member for the variable to be controlled.

According to a further feature of the invention, relating to a target-tracking radar system, the angular coordinates relative to the antenna axis are measured with the aid of two mutually independent transmitter-receiver channels operating with a single antenna but having respectively different operating frequencies. Hence, when performing mutually independent measuring operations for determining the annular coordinates of the target, the statistic errors of the two measurements are not mutually related. Consequently, the antenna can be controlled to follow the median reflection gravity center of the target with reduced statistic errors.

Compared with the known methods for reducing statistical fluctuations due to disturbance influences, the invention affords a considerable improvement without appreciably increasing the amount or space of the circuitry and components required. This will be realized from a comparison with known systems, two of which will be described presently.

According to one system, the target is independently tracked by two separate radar devices operating with respectively different frequencies and different scanning frequencies of the conical scanning motion. The median value of the individual angular coordinates is formed from the measured angular misdistances, and this median value generally exhibits a smaller amplitude of the statistic fluctuations because, on the one hand, the reflected beam gravity centers of the target for the two operating frequencies are not situated at the same locality and, on the other hand, the respective error signals obtained with the aid of the two conical scans are unequally affected by the fluctuations of the target echo. Such a solution of the problem involves a great amount of equipment and also increases the susceptibility to trouble because two complete radar systems are required.

By comparison, a saving can be achieved with another system in which both transmitter-receiver channels employ the same antenna and the angular-error voltages are produced independently of each other in the two receiving channels. In this case, the control of the follow-up system of the common antenna can be effected in response to the median value of the two independently determined error voltages. It is of advantage in this system that the reflection-beam gravity points move differently on account of the two different operating frequencies. The fluctuations of the target echo are independent of each other up to a certain degree, despite the use of the same radar system for the conical scan. It has been found that while such a system is capable of reducing the statistical angular misdistances, the improvement is still disproportionate to the necessary increases in amount of equipment.

The present invention, therefore, goes a step further and has as another object the provision of a target-tracking radar system in which the processing of the angular error signals yields considerably better results.

To this end, according to another feature of the invention, the individual components of the angular error voltages, that is, the two lateral-angle or azimuth error voltages and the two elevational angle error voltages are continuously compared with each other; and the two follow-up servomotors for controlling the elevational angle and the azimuth angle, respectively, of the antenna are controlled each time by the one selected error-voltage component possessing the smaller absolute value. This affords greatly reducing the aforementioned statistical fluctuations (1), (2) and (3).

In order that the present invention may be readily carried into effect, it will now be described with reference to an embodiment of a target-tracking radar system illustrated by way of example in the accompanying drawings, in which:

FIG. 3 is a circuit diagram of an embodiment of a signal discriminator portion of the system of FIG. 2; and FIG. 4 is a circuit diagram of an embodiment of the discriminator 10 of FIG. 2 essential to the invention.

According to FIGS. 1a and 1b, the target Z is impinged upon by two radar beams of respectively different frequencies. The penetration point of the antenna axis in the target plane is at O. In a first case represented by FIG. 1a, the gravity point of the reflection for the radar frequency $f_1$ is at $P_1$. The corresponding reflection gravity point for the frequency $f_2$ is at $P_2$. The misdistance of the reflection points, relative to the penetration point O, is designated for point $P_1$ by the coordinate components $\alpha_1$ and $\lambda_1$. The corresponding misdistance coordinates for the reflection point $P_2$ in FIG. 1a are denoted by $\alpha_2$ and $\lambda_2$.

The second possible position of the target at a different moment, represented in FIG. 1b, exhibits the reflection gravity point at $P_1$ for the radar frequency $f_1$, and at point $P_2$ for the frequency $f_2$. The corresponding coordinates are $\alpha_1$, $\lambda_1$ for point $P_1$, and $\alpha_2$, $\lambda_2$ for point $P_2$. The designation $\alpha$ applies to the azimuth component, the designation $\lambda$ applies to the elevation component of each angular misdistance.

FIG. 1a shows that in the first case the vectors $P_1$–O and $P_2$–O of the angular error are opposingly polarized. Such a correlation of the reflection gravity points is not indicative of target misdistance with respect to the antenna axis. Consequently, during continuous tracking the antenna is supposed to uniformly continue moving without positional correction; the penetration point O remaining equal to O'.

This is different for the conditions represented in FIG. 1b. In FIG. 1b, the components are pairwise equally directed, thus leading to the conclusion that a misdistance of the target from the antenna axis exists. Now, according to the invention, the smaller value of each pair of these components is selected for correcting the misdistance. These selected smaller components, under the conditions represented in FIG. 1b, are the azimuth angle $\alpha_1$ and the elevation angle $\lambda_2$. The penetration point of the antenna axis through the target plane, therefore, is to be displaced from O to O'.

Figure 2:
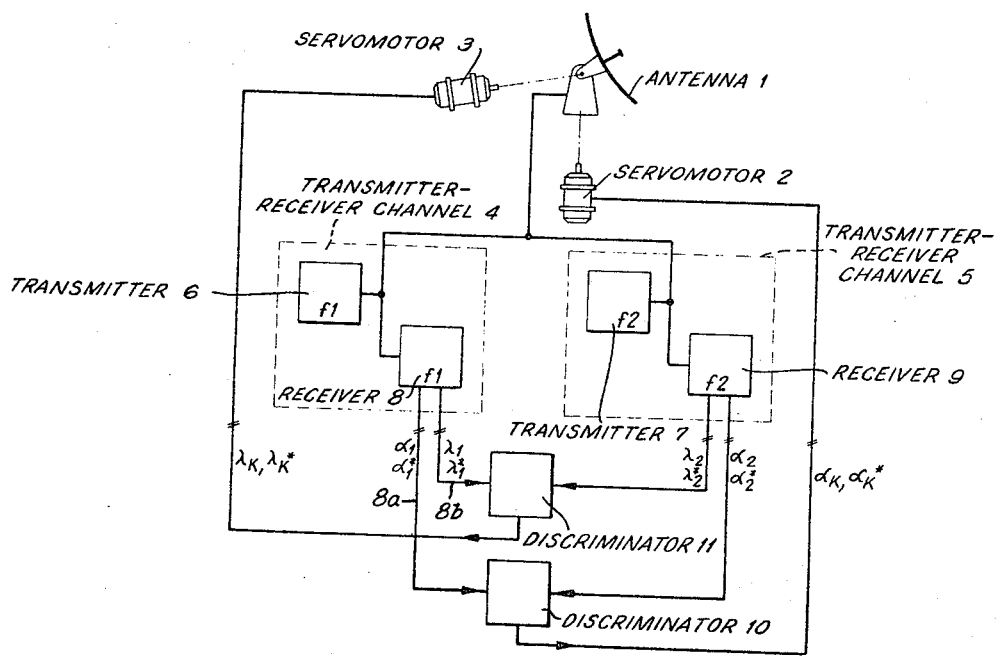
FIG. 2 is a block diagram of an embodiment of a radar system of the present invention.

The radar system schematically shown in FIG. 2 embodies the above-described method according to the invention. The antenna 1 is controlled by the elevation follow-up motor or servomotor 3, and the azimuth by servomotor 2. The two transmitter-receiver channels 4 and 5 operate at respective frequencies $f_1$ and $f_2$. Each of these channels is provided with a transmitter 6 or 7 and a receiver 8 or 9. Each receiver comprises a conventional comparator which produces an angle-error voltage. That is, the receiver-comparator 8 furnishes the azimuth error voltage $\alpha_1$ and the elevation error voltage $\lambda_1$. The receiver-comparator 9 furnishes the azimuth error voltage $\alpha_2$ and the elevation error voltage $\lambda_2$. Each of these individual error voltages appear on a two-wire line. That is, each of the lines denoted by 8a and 8b comprises two individual wires, this being schematically indicated by ≠. The two potentials of the respective wires in each line are symmetrical relative to a reference potential, preferably ground potential.

A discriminating network 10 connected to the receivers 8 and 9 serves to select the smaller one of the two azimuth angle errors available at one time. The corresponding discriminator 11, also connected to the receivers 8 and 9, analogously selects the smaller component from the two elevational angle errors available at one time. The resulting combination-error voltages ($\alpha_k$ and $\lambda_k$) are applied to and control the respective servomotors 2 and 3.

The operation of the discriminator 10 and the discriminator 11 in FIG. 2 will be explained with reference to the circuit diagram of FIG. 3.

The illustrated network serves to select from two direct voltages that voltage which is of smaller absolute magnitude at the time. The comparator comprises two diode networks with diodes 27, 28, 37, 38 and 29, 30, 39, 40. The two diode networks are connected to an amplitude discriminator network composed of diodes 48 to 51 and resistors 42 to 47. Two voltage sources 31 and 32 supply two voltages $U_1$, $U_1^*$ which, as hereinbefore explained, are symmetrical to ground potential, and two voltages $U_2$, $U_2^*$ which are also symmetrical to ground potential. When the polarity of the voltages $U_1$ and $U_1^*$ is such that the lead 33 has a positive potential, the branch point 41 has a positive potential and the branch point 57 has a negative potential relative to ground. With a corresponding polarity of voltages $U_2$ and $U_2^*$, lead 35 has a positive potential and lead 36 a negative potential relative to ground. The branch point 54 then is at positive potential and the branch point 58 at negative potential.

However, when the voltages $U_1$, $U_1^*$ or $U_2$, $U_2^*$ are oppositely polarized so that the leads 33 and 35 have a negative potential and the leads 34 and 36 have a positive potential, then the branch points 41 and 54 have a positive potential whereas the branch points 57 and 58 have a negative potential regardless of the polarity of the voltage sources 31 and 32.

In the following considerations, the voltages $U_1$ and $U_2$ are assumed to have the same polarity and the voltages $U_1^*$ and $U_2^*$ are assumed to have the same polarity. Leads 33 and 35 are at positive potential and leads 34 and 36 are at negative potential relative to ground. In explaining the operation, it is assumed that $U_1$ has a greater magnitude than $U_2$. Consequently, a current $i$ flows in lead 33 through the diode 37. At branch point 41 the current $i$ is divided into two partial currents $i_1$ and $i_2$. Current $i_2$ passes through resistor 43 and diode 38 back to source 31. The resistance of resistor 43 is large relative to the resistances of diodes 37 and 38 so that the voltage between branch points 41 and 57 is substantially the same as the source voltage.

For symmetry reasons, the voltage of the source 32 is likewise effective between the branch points 54 and 58. In accordance with the assumption that $U_1$ is larger in magnitude than $U_2$, the branch point 41 has a higher potential than the branch point 54. Consequently, the current $i_1$ tends to flow through the amplitude discriminator network from branch point 41 to branch point 54. The diode 48 blocks in this direction, so that the current $i_1$ passes through the resistor 42. The diode 49, however, is poled in the forward direction with respect to current $i_1$ and consequently has a much lower ohmic resistance than the parallel resistor 44 and the series resistor 42.

Due to these resistance relations, the points 52, 53 and 55 reach the same potential as the branch point 54. In the lower portion of the network, the branch point 57 has a more negative potential than the branch point 58. Hence the current flows through the diode 51 and through the resistor 46. Point 56 becomes adjusted to approximately the same potential as that at the branch point 58. Consequently, the same voltage can be measured between points 55 and 56 as between the branch points 54 and 58, this voltage also corresponding to the voltage of source 32 and hence to the smaller voltage $U_2 + U_2^*$.

Consequently, at the output terminals 55 and 56 there always appears the magnitude of the smaller of the two voltage sources 31 and 32, regardless of polarity. The polarity required for the control operation can be secured in a different manner, for example with the aid of a polarized relay.

If the discriminator network, aside from selecting the voltage having the smaller absolute magnitude, is also required to account for the polarity, an only slight modification will serve this purpose. It is only necessary to replace the bridge networks of diodes 27, 28, 37, 38 and of diodes 29, 30, 39, 40 with the one-way diode circuit formed of the diodes 37, 38 and 39, 40 respectively. Depending upon the polarity of these diodes, the network then only responds to one or the other polarity of the voltage sources 31 and 32. In particular, when only one of the voltage sources is oppositely polarized, the voltage having the smaller absolute magnitude at the branch points 41, 57 and 54, 58 is selected and hence the zero voltage is determined.

In order to utilize the aforedescribed circuitry for both polarities, a discriminating network of the type described must be provided for each of the respective polarities, the two networks differing from each other only by the polarities of the diodes 37 to 40 and 48 to 51. This is the case in the embodiment illustrated in FIG. 4.

The circuit diagram shown in FIG. 4 relates to the discriminator 10 of FIG. 2, for furnishing the angle-error component $\alpha_k$. According to FIG. 2, the discriminator 10 is supplied with four error voltages $\alpha_1$, $\alpha_1^*$, $\alpha_2$, and $\alpha_2^*$. For clarity, the input leads for $\alpha_1$, $\alpha_1^*$, and for $\alpha_2$, $\alpha_2^*$ of the two component discriminators are separately illustrated in FIG. 4. The output leads of the comparator network are denoted by $\alpha_k$ and $\alpha_k^*$. A comparison with FIG. 3 shows that in FIG. 4 the network of FIG. 3 is incorporated twice, but that the diodes leading away from the respective inputs identified by the same designations have different polarities, respectively. The diodes of the first comparator network at the left of FIG. 4 are denoted by 60 to 67 and the diodes of the second comparator network at the right are denoted by 68 to 75.

The resistor of the first component network are denoted by 80 to 85, and those of the second network by 86 to 91. The connection of the two networks is effected through a resistance addition network comprising resistors 100 to 103. Impedance matching of the discriminator circuitry to the devices connected thereto is effected by a twin triode 120 which also compensates the voltage losses of the resistance addition network. The operating resistances of the twin tube are denoted by 110 to 116, the poles of the direct feeder voltage by $+$ and $-$.

In explaining the operation, it is assumed that $\alpha_1$ and $\alpha_2$ are positive while $\alpha_1^*$ and $\alpha_2^*$ are negative, and that $\alpha_2$ is smaller in magnitude than $\alpha_1$. In accordance with the foregoing explanation of FIG. 3, the smaller one of the two voltages appears between the points 130 and 131 (FIG. 4), while a voltage of approximately zero appears between the points 132 and 133. Since the resistors 100, 101, 102 and 103 have equal resistances, one-half the voltage of the smaller of the error voltages $\alpha_1$ and $\alpha_2$ is provided between the two points 140 and 141. The two outputs at 140 and 141 are amplified in the tube 120 and are applied to the outputs $\alpha_k$ and $\alpha_k^*$.

When the angular error components are opposingly polarized (FIG. 1a), $\alpha_1$ is assumed to be positive and $\alpha_2$ to be negative, for example. In accordance with the symmetry of the two wires in each voltage line relative to ground, $\alpha_1^*$ is then negative and $\alpha_2^*$ is positive. Due to the blocking action of the diodes 66 and 67 relative to the voltage $\alpha_2$ and $\alpha_2^*$, and the blocking action of diodes 68 and 69 for the voltage $\alpha_1$ and $\alpha_1^*$, the output voltages at the points 130 and 131 and at the points 132 and 133 are zero. At the outputs $\alpha_k$ and $\alpha_k^*$ the voltage is also zero.

When both error voltage components are negative, the first discriminator component network is blocked and the second network is active. The function of the second network is the same as that of the first network. Consequently, the negative magnitude of the smaller applied volages $\alpha_1 - \alpha_1^*$ and $\alpha_2 - \alpha_2^*$ then appears at the output point 133 and the corresponding positive magnitude appears at the output point 132. These voltages are applied through the addition network of resistors 100 to 103 to the amplifier tube 120 and after amplification appear at the outputs $\alpha_k$ and $\alpha_k{}^*$.

Figure 1:
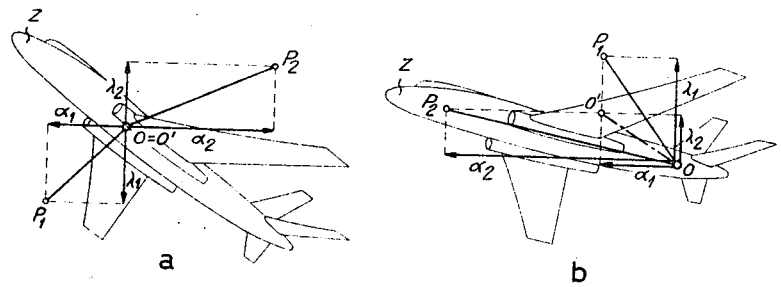
FIGS. 1a and 1b are explanatory and represent different possible positions of instantaneous reflection-beam gravity points at an aircraft in flight.

While the foregoing description relates to the discriminator 10 according to FIG. 2, it will be understood that the discriminator 11 is designed and operative in the same manner. The effect of the discriminators in the system of FIG. 2 with respect to the performance explained above with reference to FIG. 1 is as follows. Relative to the two points $P_1$ and $P_2$ occurring under the conditions described with reference to FIG. 1a, no correction of the radar antenna tracking motion is effected because then the correction system according to the invention as hereinbefore described is inactive. However, if the conditions correspond to those illustrated in FIG. 1b, the misdistance of the target defined by the points $P_1$ and $P_2$ in FIG. 1b is corrected. Under these conditions the servomotor 2 (FIG. 2) for the azimuth control is supplied the error voltage $\alpha_1$ and the servomotor 3 for the elevation angle control is supplied the error voltage $\lambda_2$. Consequently, the antenna axis moves in the direction from point O toward the point O'.

It will be understood that while the invention has been described above with reference to a preferred embodiment relating to radar tracking, it is also applicable to other feedback control systems of the general type mentioned introductorily in this specification. It will also be apparent to those skilled in the art from a study of this specification that may invention permits of various modifications with respect to system components and circuitry and hence can be given embodiments other than particularly illustrated and described, without departing from the essential features of my invention and within the scope of the claims annexed hereto.

APPENDIX (GLOSSARY)

Since the terminology relating to the parameters occurring in feedback control systems is not uniform in American industry and literature and sometimes based on concepts different from those prevailing in other countries (see "Feedback Control Systems" by Gille, Pelegrin and Decaulne, McGraw-Hill Book Company Inc., New York, 1959, pages 757 to 774), the following is offered with reference to the terminology used in this disclosure.

The term "pilot signal" denotes a voltage or other signal indicative of the actual value of the controlled variable, this being the quantity or condition to be regulated. The pilot signal is derived from the controlled variable directly or by means of a sensor and may be available as a "pilot voltage."

The term "datum signal" or "datum input" denotes a reference quantity indicative of the desired quantity or condition which the controlled variable or pilot signal is to maintain by virtue of the feedback-control or regulating performance. The datum signal may be supplied as a datum or reference voltage, also called the "pattern voltage," for comparison with the pilot voltage.

The term "error signal" denotes the quantity which results from the comparison and corresponds to the difference between the pilot signal, which is the actual value of the controlled variable, and the datum signal, which is the desired value of the controlled variable.

The "control signal," which is also called "manipulated variable," is the quantity or condition which, in dependence upon the error signal, causes a change of the controlled variable and hence of the pilot voltage in the sense and by the amount required to minimize or eliminate the error signal.

The following simple example will elucidate the foregoing terms. The speed or controlled variable of an electric motor is to be regulated to a constant datum value by changing the energizing or field voltage of the motor with the aid of a servo-operated control resistor. The resistance variation of the resistor constitutes the "control signal" or manipulated variable. The speed of the motor is sensed by a tachometer generator which furnishes a voltage or pilot signal indicative of the actual instantaneous speed. The "pilot voltage" from the tachometer is compared with a "datum or reference voltage" taken from a reference potentiometer. The difference between the pilot voltage and the datum or reference voltage constitutes the "error voltage" and controls the "control signal" to correspondingly vary the motor speed.

A "disturbance" is a signal other than the datum or reference input which tends to affect the value of the controlled variable.

This terminology is substantially in harmony with the glossary of terms on page 305 and following in the book "Servomechanism Practice" by W. R. Ahrendt, McGraw-Hill Book Company Inc., New York, 1954.

I claim:

1. The method of reducing the statistical fluctuations of the controlled variable in follow-up servosystems, which comprises deriving from the controlled variable a plurality of pilot signals whose respective fluctuations are mutually unrelated; producing respective error signals from said pilot signals; comparing said error signals; and selectively applying the one error signal of the smallest absolute magnitude for servocontrol of the controlled variable.

2. The method of reducing the statistical fluctuations of the controlled variable in follow-up servosystems, which comprises deriving from the controlled variable two pilot signals whose respective fluctuations are mutually unrelated; producing respective error signals from said pilot signals; comparing said error signals as to polarity and magnitude; selectively applying the one error signal having the smaller magnitude for servocontrol of the controlled variable when said two error signals have the same polarity; and suppressing both of said error signals as to said servocontrol when said two error signals have opposed polarities.

3. The method of reducing the statistical fluctuations of the controlled variable angular antenna position in follow-up servosystems of target-tracking radar, which comprises tracking the target with two mutually independent radar transmitting-receiving channels at respectively different operating frequencies and thereby deriving from the controlled variable setting, via reflection from the target, two pilot signals whose respective fluctuations are mutually unrelated; producing respective error signals from said pilot signals; comparing said error signals; and selectively applying only the smaller one of the error signals for servocontrol of the variable antenna position.

4. The method of reducing the statistical fluctuations of the controlled variable angular antenna position in follow-up servosystems of target-tracking radar, which comprises tracking the target with two mutually independent radar transmitting-receiving channels at respectively different operating frequencies and thereby deriving from the controlled variable setting, via reflection from the target, two pilot signals for each of the elevation and azimuth data, the respective fluctuations of the two pilot signals for each of said data being mutually unrelated; producing an elevation error signal and an azimuth error signal from each of said two pilot signals; comparing the two elevation error signals with each other, separately comparing the two azimuth error signals with each other; and selectively applying the smaller one of each pair of error signals for servocontrol of the antenna position.

5. The method of reducing the statistical fluctuations of the controlled variable angular antenna position in follow-up servosystems of target-tracking radar, which comprises tracking the target with two mutually independent radar transmitting-receiving channels at respectively different operating frequencies and thereby deriving from the controlled variable setting, via reflection from the target, two voltages for each of the elevation and azimuth data, the respective fluctuations of the two pilot voltages for each of said data being mutually unrelated; producing an elevation error voltage and an azimuth error voltage from each of the two pilot voltages; comparing the two elevation error voltages with each other; separately comparing the two azimuth error voltages with each other; selectively applying the smaller one of each voltage pair for servocontrol of the antenna elevation and azimuth respectively when the two voltages of the pair have the same polarity; and suppressing both of the error voltages as to said servocontrol when the two voltages of a pair of error voltages have opposed polarities.

6. In a follow-up servosystem having control means for varying the controlled variable of the system, the combination of means for reducing the statistical fluctuations of the control means comprising means for providing a plurality of error voltages each being indicative of the departure of the controlled variable from a datum values; a discriminator having respective inputs connected to said error voltage providing means for selecting from said error voltages the one having the smallest absolute magnitude; and means connecting said discriminator to said control means for applying said one selected error voltage for servocontrol of the controlled variable.

7. In a follow-up servosystem having control means for varying the controlled variable of the system, the combination of means for reducing the statistical fluctuations of the control means comprising means for providing direct-current error voltages indicative of the departure of the controlled variable from a reference value; a discriminator comprising two diode circuits connected to said error voltage providing means for receiving said respective error voltages therefrom and each having an output branch of fixed voltage polarity independent of the polarity of said error voltages, and an amplitude selector network having two inputs connected to said respective two branches and having an output circuit whose voltage is in accordance with the one error voltage having the smaller absolute value; and means connecting said discriminator output circuit to said control means for applying said one error voltage for servocontrol of the controlled variable.

8. In a follow-up servosystem with fluctuation reducing means according to claim 7, wherein each of its two diode circuits of said discriminator comprises a bridge network having four bridge arms each having a diode connected therein, and the output branch of each of the diode circuits of said discriminator comprises resistance means connected in the amplitude selector network of said discriminator.

9. In a follow-up servosystem with fluctuation reducing means according to claim 7, wherein each of said means for providing direct-current error voltages has a grounded mid-potential, and wherein each of the two diode circuits of said discriminator comprises two diode paths of mutually opposed polarity and resistance means having its ends connected through said respective diode paths to one of said respective means for providing error voltages, said resistance means comprising part of the amplitiude selector network of said discriminator.

10. In a follow-up servosystem having control means for varying the controlled variable of the system, the combination of means for reducing the statistical fluctuations of the control means comprising means for providing direct-current error voltages indicative of the departure of the controlled variable from a reference valve; an amplitude discriminator having two electrically symmetrical diode networks inputwise connected to said means for providing error voltages and having output terminals for supplying a control voltage corresponding to the one error voltage having the smaller magnitude, each of said two diode networks each having two diode pairs each comprising a pair of diodes mutually opposed polarity and having a resistor connected between the respective diode midpoints of said two pairs, and resistive circuit means connecting said midpoints to said output terminals; and means connecting the output terminals of the diode networks of said amiplitude discriminator to said control means for applying said one error voltage for servocontrol of the controlled variable.

11. In a follow-up servosystem having control means for varying the controlled variable of the system, the combination of means for reducing the statistical fluctuations of the control means comprising means for providing direct-current error voltages indicative of the departure of the controlled variable from a reference value; an amplitude discriminator comprising two diode networks for the two polarities respectively of said error voltages, each of said diode networks having two inputs and diodes poled in opposed polarity relation to the respective diodes of the other of said diode networks, each of said diode networks providing an output voltage corresponding to the one error voltage having the smaller amplitude; and circuit means connecting the output voltages of the diode networks of said amplitude discriminator to said control means for controlling said controlled variable in response to said one error voltage.

12. In a follow-up servosystem with fluctuation reducing means according to claim 11, wherein said circuit means comprises two resistive voltage-addition branches of which each connects the positive output potential of one of said respective diode networks of said amplitude discriminator with the negative potential of the other diode network of said amplitude discriminator, and a control circuit connected between the resistance midpoints of said respective two branches to furnish a control voltage for controlling said control means.

13. In a follow-up servosystem of a tracking radar having servocontrol means for varying the controlled variable constituted by the angular position of a radar antenna axis, the combination of means for reducing the statistical fluctuations of the servocontrol means comprising two radar transmitter-receiver channels having said antenna axis in common and providing respectively different signal frequencies from said antenna; means for providing error voltages indicative of the departure of the controlled variable from a reference value; discriminator means having inputs connected to said transmitter-receiver channels for selecting the one error voltage having the smaller amplitude; and circuit means connecting said discriminator means to said servocontrol means for applying said one error voltage to the follow-up control of said antenna axis.

14. In a follow-up servosystem of a tracking radar with fluctuation reducing means according to claim 13, wherein said servocontrol means comprises two servomotors for azimuth and elevation control respectively of the antenna axis, said discriminator having polarity-responsive circuit means for supplying to said circuit means the smaller one of two azimuth components and the smaller one of two elevation components.

15. In a follow-up servosystem having control means for varying the controlled variable of the system, the combination of means for reducing the statistical fluctuations of the control means comprising means for providing a plurality of error signals each being indicative of the departure of the controlled variable from a datum value; a discriminator having respective inputs connected to said error signal providing means for selecting from said error signals the one having the smallest absolute magnitude; and means connecting said discriminator to said control means for applying said one selected error signal for servocontrol of the controlled variable.

No references cited.

CHESTER L. JUSTUS, *Primary Examiner.*

T. H. TUBBESING, *Assistant Examiner.*